(12) United States Patent
Anton Falcon et al.

(10) Patent No.: US 10,439,391 B2
(45) Date of Patent: Oct. 8, 2019

(54) DOMESTIC APPLIANCE HAVING A STAND-BY MODE AND METHOD FOR OPERATING SUCH A DOMESTIC APPLIANCE

(75) Inventors: Daniel Anton Falcon, Saragossa (ES); Claudio Carretero Chamarro, Saragossa (ES); Ignacio Garde Aranda, Saragossa (ES); Pablo Jesus Hernandez Blasco, Cuarte de Huerva (ES); Javier Herrera Rodriguez, Saragossa (ES); Sergio Llorente Gil, Saragossa (ES); Oscar Lucia Gil, Saragossa (ES); Ignacio Millan Serrano, Saragossa (ES); Daniel Palacios Tomas, Saragossa (ES)

(73) Assignee: BSH Hausgeräte GmbH, Munich (DE)

(*) Notice: Subject to any disclaimer, the term of this patent is extended or adjusted under 35 U.S.C. 154(b) by 859 days.

(21) Appl. No.: 14/003,472

(22) PCT Filed: Feb. 27, 2012

(86) PCT No.: PCT/IB2012/050889
§ 371 (c)(1),
(2), (4) Date: Sep. 6, 2013

(87) PCT Pub. No.: WO2012/123838
PCT Pub. Date: Sep. 20, 2012

(65) Prior Publication Data
US 2013/0342016 A1 Dec. 26, 2013

(30) Foreign Application Priority Data
Mar. 11, 2011 (ES) .................................. 201130336

(51) Int. Cl.
*H02J 3/00* (2006.01)
*H02J 9/00* (2006.01)
*H02J 3/14* (2006.01)

(52) U.S. Cl.
CPC ................ *H02J 3/00* (2013.01); *H02J 9/005* (2013.01); *H02J 2003/143* (2013.01);
(Continued)

(58) Field of Classification Search
CPC ........ H02J 3/00; H02J 9/005; H02J 2003/143; Y02B 70/3266; Y02B 70/3233; Y10T 307/469
(Continued)

(56) References Cited

U.S. PATENT DOCUMENTS

| 6,272,030 B1* | 8/2001 | Oomura | H02M 7/06 363/126 |
| 2002/0012258 A1* | 1/2002 | Nagai | H02J 9/005 363/95 |

(Continued)

FOREIGN PATENT DOCUMENTS

| CN | 201054087 Y | 4/2008 |
| EP | 0803966 A2 | 10/1997 |

OTHER PUBLICATIONS

Hewlett Packard, HP High Efficiency Common Slot Power Supplies, Data Sheet, p. 3.*
(Continued)

*Primary Examiner* — Rexford N Barnie
*Assistant Examiner* — Thai H Tran
(74) *Attorney, Agent, or Firm* — Michael E. Tschupp; Andre Pallapies; Brandon G. Braun (57) ABSTRACT

A domestic appliance includes a mains connection at which an electrical mains voltage can be applied relative to a reference potential, a main supply unit supplying an elec-
(Continued)

trical operating voltage from the mains voltage at its output, and at least one electrical consumer receiving the operating voltage. An electrical switch electrically isolates at least the output of the main supply unit from the mains connection, when the domestic appliance is in a standby mode. Provided separate from the main supply unit is a voltage supply which is coupled to the mains connection and which taps the mains voltage at the mains connection in the standby mode and supplies a supply voltage from the mains voltage for switching the electrical switch to an electrically conducting switching state to thereby switch the domestic appliance from the standby mode to an operating mode.

25 Claims, 4 Drawing Sheets (52) U.S. Cl.
CPC ....... *Y02B 70/3233* (2013.01); *Y02B 70/3266* (2013.01); *Y04S 20/225* (2013.01); *Y04S 20/242* (2013.01); *Y10T 307/469* (2015.04)

(58) Field of Classification Search
USPC .......................................................... 307/39
See application file for complete search history.

(56) References Cited

U.S. PATENT DOCUMENTS

| | | | |
|---|---|---|---|
| 2002/0145339 A1* | 10/2002 | Liu ........................ | H02J 1/102 307/77 |
| 2002/0195880 A1 | 12/2002 | Bij De Leij | |
| 2003/0015998 A1* | 1/2003 | Takahashi ............... | H02M 1/36 323/267 |
| 2003/0025395 A1* | 2/2003 | Peterson ................. | D06F 33/02 307/11 |
| 2004/0105034 A1* | 6/2004 | Libera .................... | H02J 9/005 348/730 |
| 2005/0099314 A1* | 5/2005 | Aisa ........................ | H02J 3/14 340/637 |
| 2006/0012338 A1* | 1/2006 | Etzold .................... | H02J 7/0075 320/125 |
| 2006/0143488 A1* | 6/2006 | Peleg ...................... | H04L 12/10 713/330 |
| 2007/0040537 A1* | 2/2007 | Low ....................... | H02M 3/1588 323/282 |
| 2007/0047270 A1* | 3/2007 | Makino ................... | H02J 9/005 363/34 |
| 2008/0168281 A1* | 7/2008 | MacInnes ................ | G06F 1/26 713/300 |
| 2009/0027929 A1* | 1/2009 | Kim ........................ | H02M 7/064 363/65 |
| 2009/0040672 A1* | 2/2009 | Chishima ................ | H02J 9/005 361/63 |
| 2009/0119525 A1* | 5/2009 | Morimoto .............. | B41J 29/393 713/323 |
| 2009/0224603 A1* | 9/2009 | Perper ..................... | G06F 1/26 307/43 |
| 2009/0287946 A1* | 11/2009 | Lin ......................... | G06F 1/3203 713/323 |
| 2009/0289507 A1* | 11/2009 | Shiu ........................ | H02J 9/005 307/131 |
| 2009/0322159 A1* | 12/2009 | DuBose .................. | H02J 9/005 307/117 |
| 2009/0322257 A1* | 12/2009 | Kim ........................ | H02J 9/005 315/308 |
| 2010/0008117 A1 | 1/2010 | Luthi et al. | |
| 2010/0164285 A1* | 7/2010 | Kitano .................... | H02J 9/005 307/38 |
| 2010/0302757 A1 | 12/2010 | Bennett, Jr. | |
| 2011/0012428 A1* | 1/2011 | Chen ....................... | H02J 9/005 307/66 |
| 2011/0090469 A1* | 4/2011 | Kotani .................... | G03B 21/14 353/52 |
| 2011/0110129 A1* | 5/2011 | Busch ..................... | H02J 9/005 363/53 |
| 2011/0298279 A1* | 12/2011 | Dimrco ................... | H02J 9/005 307/31 |
| 2011/0302433 A1* | 12/2011 | Liu ......................... | H02J 9/005 713/320 |
| 2012/0020131 A1* | 1/2012 | Chan ....................... | H02J 9/005 363/126 |
| 2012/0092897 A1* | 4/2012 | Hara ....................... | H02J 9/005 363/16 |
| 2012/0139477 A1* | 6/2012 | Oglesbee ................ | H02J 7/00 320/107 |
| 2012/0161522 A1* | 6/2012 | Nam ....................... | H02J 9/005 307/64 |
| 2012/0229831 A1* | 9/2012 | Kuroishi ............. | H04N 1/00891 358/1.13 |
| 2012/0235490 A1* | 9/2012 | Lee ........................ | H02J 9/005 307/66 |
| 2012/0257426 A1* | 10/2012 | Serrano .................. | H02J 7/022 363/49 |
| 2012/0257428 A1* | 10/2012 | Nomura .................. | H02J 9/005 363/126 |
| 2013/0031396 A1* | 1/2013 | Inukai .................... | H02M 7/066 713/323 |

OTHER PUBLICATIONS

Eric Wilcox, Right-Sized Power Systems: Means to Improved Energy, DELL, p. 8.*
On Semiconductor, On Semiconductor Reference Design, p. 7.*
National Search Report CN 201280012772.6 dated May 6, 2015.
International Search Report PCT/IB2012/050889, dated Jun. 18, 2012.
National Search Report ES P201130336, dated Jul. 3, 2013.

* cited by examiner

Fig.1

(Prior Art)

DOMESTIC APPLIANCE HAVING A STAND-BY MODE AND METHOD FOR OPERATING SUCH A DOMESTIC APPLIANCE

BACKGROUND OF THE INVENTION

The invention relates to a domestic appliance—in particular for the preparation of food—which can be switched to and fro between a standby mode and an operating mode (active mode). The domestic appliance has an electrical mains connection, at which an electrical mains voltage can be applied relative to a reference potential. It also comprises a main supply unit—for example a power pack—which supplies an electrical operating voltage from the mains voltage, specifically at an output. An electrical consumer (for example a main control unit and/or a sensor of the domestic appliance) is supplied with the operating voltage. The invention also relates to a method for operating such a domestic appliance.

In the prior art, a power pack is deployed in a domestic appliance. The power pack has the task of converting the electrical mains voltage, which is an alternating voltage, to an operating voltage, which is tailored to the electrical consumers of the domestic appliance, for example a control unit. The operating voltage is generally a direct voltage. Interest is primarily directed at a domestic appliance which has a standby mode. This standby mode is more energy-efficient than the operating mode and the domestic appliance consumes less energy than in operating mode. On the one hand, standby mode is intended to ensure that stored data is not lost and the operator can activate the domestic appliance quickly without having to reset the program code and restart the appliance. On the other hand, energy consumption is intended to be reduced to a minimum in standby mode.

Figure 1:
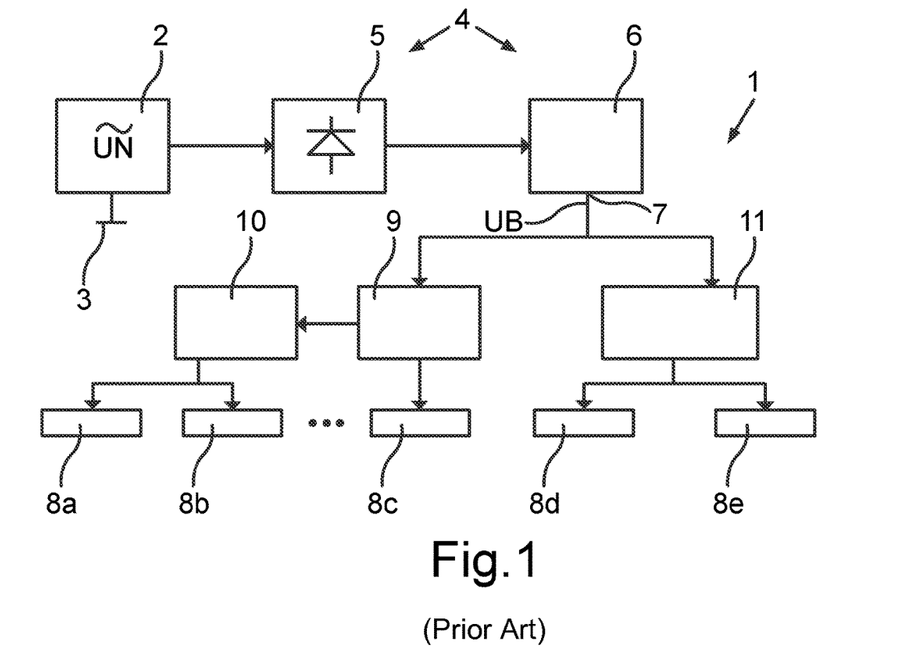
FIG. 1 shows a block circuit diagram of a circuit arrangement for a domestic appliance according to the prior art.

In order to keep energy consumption as minimal as possible in standby mode, integrated circuits (IC) are used in the prior art, which can be switched to their own standby mode. For example voltage regulators with an integrated standby functionality are used here. When the voltage regulator is switched to standby mode, the connected consumers are also decoupled from the electrical voltage. A block circuit diagram of a known circuit arrangement 1 for a domestic appliance is shown in FIG. 1. It comprises a mains connection 2, at which a mains voltage UN is supplied, specifically relative to a reference potential 3. A main supply unit 4 is connected directly to the mains connection 2. It comprises a bridge rectifier 5—in some instances also with a smoothing capacitor (hold up)—as well as a power pack or voltage converter 6. Present at an output 7 of the main supply unit 4 is an operating voltage UB, which is produced from the mains voltage UN. The main supply unit 4 therefore supplies the operating voltage UB. This operating voltage UB is then used to supply a plurality of electrical consumers 8a to 8e, the number of which can in principle be arbitrary. The consumers 8a to 8e can comprise a main control unit of the domestic appliance, as well as sensors of any type and the like. The operating voltage UB is tapped at the output 7 by a voltage regulator 9 and stabilized or regulated. Also connected to the voltage regulator 9 is a further voltage regulator 10. While the consumers 8a and 8b are supplied by way of the voltage regulator 10, the voltage regulator 9 supplies the consumer 8c. The consumers 8d and 8e are in contrast coupled to the output 7 of the main supply unit 4 by way of a power divider 11. Both the voltage regulators 9, 10 and the power divider 11 are supplied as integrated circuits, which can be switched to an internal standby mode and therefore as it were deactivated. When the domestic appliance is switched to standby mode, corresponding control signals are emitted to the integrated circuits and said circuits are deactivated. This means that the consumers 8a to 8e are also isolated from the operating voltage UB.

In order to reduce the energy take-up of the domestic appliance as a whole to a minimum in standby mode, the consumption of the circuits in standby mode should also be correspondingly low. The energy consumption of the domestic appliance as a whole in standby mode is in fact a direct function of the energy take-up of the circuits. On the one hand therefore the number of circuits in the domestic appliance must be limited; on the other hand appropriate circuits must be selected and used, which have very low energy consumption in standby mode. This in turn is associated with a relatively major outlay when selecting the circuits, as well as with higher circuit costs. Also the main supply unit 4 consumes a relatively large amount of energy in standby mode. One particular challenge is to find a solution for reducing the outlay when selecting the circuits and the circuit costs to a minimum, without increasing the energy consumption of the domestic appliance as a whole in standby mode.

BRIEF SUMMARY OF THE INVENTION

The object of the invention is to show how on the one hand there can be a certain freedom when choosing electronic components—for example said circuits—for a domestic appliance of the type mentioned in the introduction and on the other hand how the energy consumption of the domestic appliance can also be reduced to a minimum in standby mode.

According to the invention this object is achieved by a domestic appliance with the features and advantages of the exemplary embodiments of the apparatus and methods described herein.

An inventive domestic appliance can be switched to and fro between a standby mode and an operating mode. It has a mains connection, at which an electrical mains voltage can be supplied, relative to a reference potential (ground). A main supply unit is configured to supply an electrical operating voltage from the mains voltage, specifically at an output of the main supply unit. At least one electrical consumer can be supplied with the operating voltage. An electrical switch is provided, by means of which at least the output of the main supply unit is electrically isolated from the mains connection in standby mode. Therefore at least the output of the main supply unit—and in particular the main supply unit as a whole—can be coupled by way of the switch to the mains connection; in standby mode the switch is in an electrically blocking switching state. The domestic appliance also comprises voltage supply means, which are separate or different from the main supply unit and are coupled—in particular directly connected—to the mains connection and which tap the mains voltage at the mains connection in standby mode and supply a supply voltage—in particular a direct voltage—from said mains voltage, with which the electrical switch can be switched to its electrically conducting switching state, by which means the domestic appliance can be switched from standby mode to operating mode.

Thus, in standby mode, at least the output of the main supply unit and in particular the main supply unit as a whole is isolated from the mains connection and therefore from the mains voltage. Therefore, in standby mode there is no operating voltage present at the output of the main supply unit and all the components connected to the main supply unit are completely decoupled from the main supply unit and the mains connection and therefore consume no energy, for example voltage regulators, power dividers and the like. In contrast to the prior art, the voltage required to switch the domestic appliance to operating mode is produced by means of the separate voltage supply means, which are connected as it were parallel to the main supply unit and can be embodied as smaller and therefore more energy-efficient than the main supply unit. The inventive domestic appliance has a number of advantages: on the one hand in principle any electronic components, such as integrated circuits, can be coupled to the main supply unit. Such components do not have to have integrated standby functionality, as in standby mode the output of the main supply unit is decoupled from the mains connection anyway. This allows a certain freedom when choosing the electronic components. On the other hand, the energy consumption of the domestic appliance is minimal in standby mode. In fact, it may only be the voltage supply means (for example a small power pack), which are connected to the mains connection in standby mode, while the main supply unit can be completely isolated from the mains connection.

The invention also has the advantage that existing domestic appliances without a standby mode can be retrofitted accordingly, so that they also have a standby mode. It is only necessary to insert an electrical switch for existing power packs, as well as voltage supply means which tap the mains voltage in standby mode and supply the supply voltage to close the electrical switch.

A domestic appliance here is understood primarily to mean in particular a household appliance, which is used for household management. It can be a domestic appliance for preparing food, for example an oven and/or cooktop, or a laundry care appliance, for example a washing machine, washer/dryer or tumble dryer.

The main supply unit therefore serves to convert the mains voltage to the operating voltage, which is preferably a direct voltage. To this end the main supply unit can comprise a power pack, in particular a switched-mode power pack, and/or a voltage converter. The main supply unit can also comprise a rectifier, optionally with a smoothing capacitor.

The voltage supply means can also have a power pack, by means of which the mains voltage is converted to the supply voltage. The voltage supply means can also comprise a microcontroller, which can close the electrical switch and therefore switch the domestic appliance to operating mode, specifically by outputting corresponding control signals to the switch. The power pack can also optionally take over the function of the microcontroller.

The voltage supply means are preferably configured to supply a lower electrical power than the main supply unit. This power can be dimensioned so that it is only sufficient to close the electrical switch and in particular also to supply an operating facility in standby mode. The energy consumption of the domestic appliance in standby mode is then minimal.

The domestic appliance can have an operating facility which can be actuated by an operator. Based on actuation by the operator this operating facility can generate an activation signal, on the basis of which the electrical switch is switched to its conducting switching state and the domestic appliance is therefore switched to operating mode. The operator can therefore use the operating facility to switch the domestic appliance from standby mode to operating mode, in other words to activate it. The operating facility can be an active operating facility. It can be supplied with the supply voltage in standby mode. It may only be the operating facility which is active as an electrical consumer in standby mode, so that energy take-up is reduced to a minimum in standby mode.

The operating facility can comprise for example a capacitive switch, the capacitance of which changes when it is touched by the operator. This change in capacitance can then cause the activation signal to be generated and the domestic appliance to be switched to operating mode.

The energy consumption of the domestic appliance in standby mode is then minimal, when only the voltage supply means are connected to the mains connection and tap the mains voltage at this mains connection in standby mode. This means that in standby mode further power packs that may be present are isolated from the mains connection and therefore consume no energy. These further power packs can only be coupled to the mains connection in operating mode.

The electrical switch is preferably a mechanical switch, in particular a relay. No leakage currents then flow through the switch in standby mode, and there are no electrical losses.

As mentioned above, at least the output of the main supply unit is electrically isolated from the mains connection in standby mode so that all the components coupled to the output are also decoupled from the mains connection. However as electrical losses can occur in the main supply unit in standby mode—for example due to leakage currents through capacitors—it has proven to be particularly advantageous for the electrical switch to be located between the mains connection and the main supply unit. The switch can therefore isolate the entire main supply unit from the mains connection in standby mode, so no losses can occur through the main supply unit.

If a mains filter (electromagnetic compatibility or EMC filter) is coupled to the main supply unit, the electrical switch is preferably disposed between the mains filter and the mains connection. This also prevents electrical losses through the mains filter.

The domestic appliance can comprise a power electronics unit. This power electronics unit can comprise electrical consumers, which consume a relatively large amount of power and are supplied with a high-amplitude electrical voltage, for example the rectified mains voltage. The power electronics unit can be coupled by way of a further electrical switch, in particular a mechanical switch, preferably a relay, to the mains connection. When the domestic appliance is switched from standby mode to operating mode, the first switch (for the main supply unit) is preferably closed first and then the further switch (for the power electronics unit). This has the advantage that a control unit of the domestic appliance supplied with the operating voltage can monitor the time of closing of the further switch and therefore the level of an inrush current flowing through the power electronics unit.

The further switch can be closed taking into account a mains voltage profile. This can be such that the time of closing of the further switch corresponds to a zero passage of the mains voltage. The strength of the inrush current is then minimal and there is no need for an inrush current limiter, for example a fuse.

Provision can also be made for the voltage supply means to be configured to detect a temperature of said inrush current limiter. The voltage supply means can then also close the further switch (for the power electronics unit) taking into account the temperature. This is based on the fact that NTC (negative temperature coefficient) elements are generally used as inrush current limiters and their resistance value is a function of temperature. If the temperature of such an inrush current limiter is relatively high, the ohmic resistance of the inrush current limiter is also correspondingly low. The further switch can therefore only be closed on condition that the detected temperature is below a predefined limit value, which can lie in a value range from 55° C. to 75° C. and be for example 65° C. This prevents the further switch being closed when the resistance value of the inrush current limiter is too low. This limits the strength of the inrush current.

The voltage supply means can also have a further functionality: in standby mode they can check the mains connection for any polarity reversal based on the tapped mains voltage. If there is a polarity reversal of the three-phase mains voltage (380 volts), the closing of the electrical switch and therefore the activation of the domestic appliance can be prevented. This allows the complexity of the main supply unit and optionally also further power packs of the domestic appliance to be reduced, as the main supply unit no longer needs to be designed to withstand a polarity reversal of the mains connection. In the event of a polarity reversal it remains isolated from the mains connection by the switch.

The invention also relates to a method for operating a domestic appliance, which can be switched between a standby mode and an operating mode. An electrical mains voltage is applied relative to a reference potential at a mains connection and a main supply unit supplies an electrical operating voltage from the mains voltage at its output. At least one electrical consumer is supplied with the operating voltage. In standby mode at least the output of the main supply unit is isolated from the mains connection by means of an electrical switch. Voltage supply means coupled to the mains connection tap the electrical mains voltage at the mains connection in standby mode and supply a supply voltage from said mains voltage. The electrical switch is switched to its electrically conducting state with the supply voltage, thereby switching the domestic appliance from standby mode to operating mode.

The preferred embodiments and their advantages presented in relation to the inventive domestic appliance apply correspondingly to the inventive method.

Further features of the invention will emerge from the claims, the figures and the description of the figures, All the features and feature combinations cited above in the description and the features and feature combinations cited below in the description of the figures and/or simply shown in the figures can be used not only in the respectively cited combination but also in other combinations or alone.

BRIEF DESCRIPTION OF THE DRAWINGS

The invention is described in more detail below based on individual preferred exemplary embodiments, as well as with reference to the accompanying drawings, in which.

DETAILED DESCRIPTION OF EXEMPLARY EMBODIMENTS OF THE PRESENT INVENTION

Figure 2:
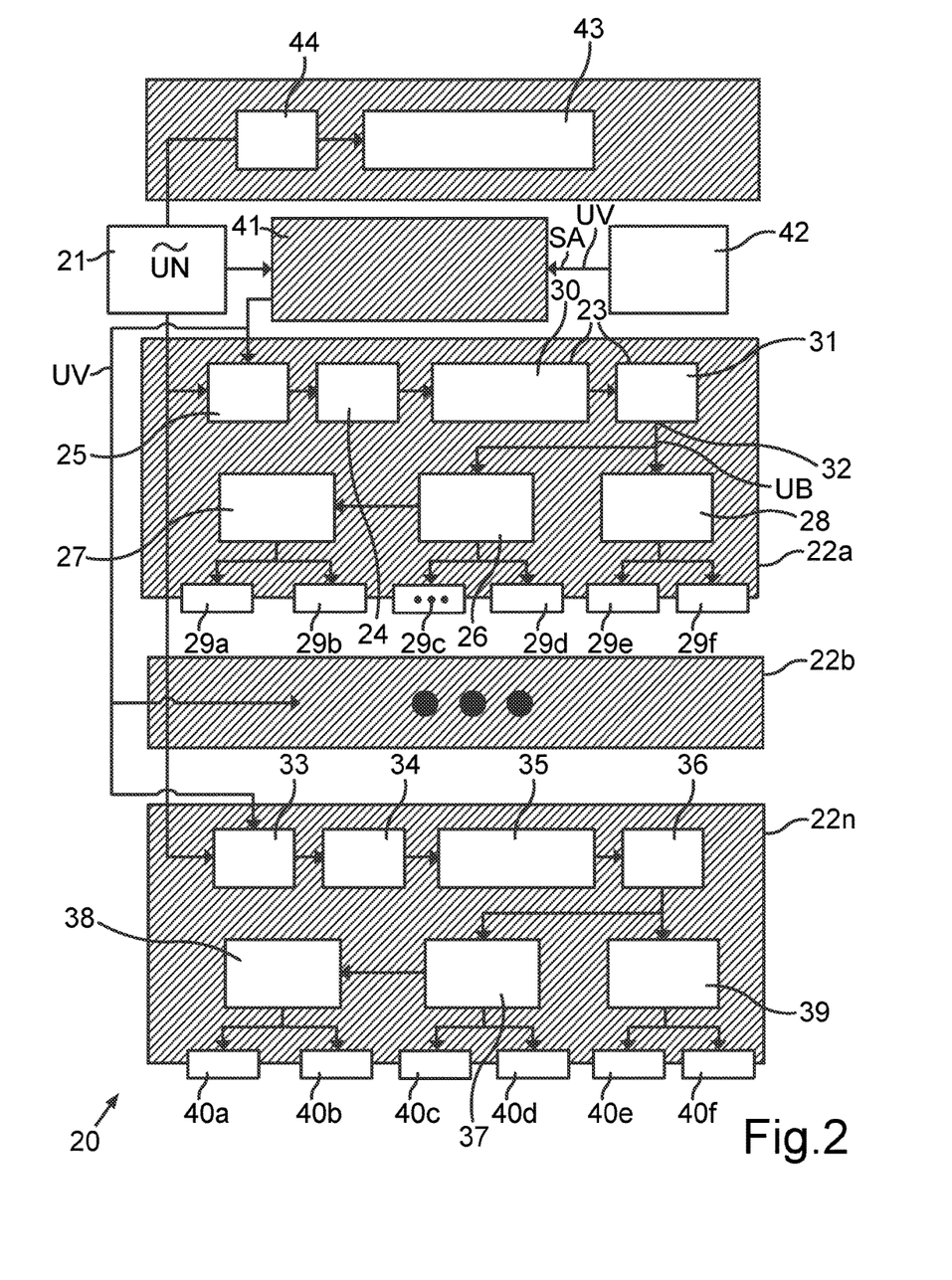
FIG. 2 shows a block circuit diagram of a circuit arrangement for a domestic appliance according to an embodiment of the invention.

A circuit arrangement 20 illustrated in FIG. 2 serves to operate a domestic appliance, for example a domestic appliance for preparing food, such as an oven and/or cooktop. The domestic appliance can therefore generally be a cooking appliance. The domestic appliance here can be switched to and fro between a standby mode and an operating mode (active mode). The aim is to reduce the energy take-up of the domestic appliance—in other words the energy consumption of the circuit arrangement 20—in standby mode to a minimum.

The circuit arrangement 20 comprises a mains connection 21, at which an electrical mains voltage UN relative to a reference potential (ground) is present when the circuit arrangement 20 is connected to an electrical power network. The circuit arrangement 20 also comprises a plurality of circuit units 22*a*, 22*b* to 22*n*, the number of which can in principle be arbitrary. These circuit units 22*a*, 22*b* to 22*n* can be independent circuit units or higher or lower order circuit units. For example the circuit unit 22*a* here can be a higher order circuit unit than other circuit units, comprising a main control unit of the domestic appliance, which controls further circuit units.

The circuit units 22*a*, 22*b* to 22*n* can in principle have an identical structure.

The circuit unit 22*a* comprises the following components: a main supply unit 23, a mains filter or EMC filter 24, an electrical switch 25, two voltage regulators 26, 27, a power divider 28 (secondary power line), as well as a plurality of electrical consumers 29*a* to 29*f*, the number of which can be arbitrary. Associated with the main supply unit 23 are a bridge rectifier 30—optionally with a smoothing capacitor—and a power pack 31, for example a switched-mode power pack. The main supply unit 23 can be coupled electrically by way of the power pack 24 and by way of the electrical switch 25 to the mains connection 21. The main supply unit 23 can produce an operating voltage UB from the mains voltage UN, specifically at an output 32. The operating voltage UB here is a direct voltage with an amplitude of for example 3V or 5V or 7V or 9V or 12V or 15V or 17V or 19V or 24V. This amplitude can quite generally lie in a value range from 3V to 24V.

The operating voltage UB is stabilized by the voltage regulator 26, by way of which the electrical consumers 29*c* and 29*d* are supplied. Also connected to the voltage regulator 26 is the further voltage regulator 27, by way of which the consumers 29*a* and 29*b* are supplied. The operating voltage UB is also tapped by the power divider 28, which supplies the consumers 29*e* and 29*f*.

The electrical consumers 29*a* to 29*f* can comprise any electrical consumers. Examples here could be a main control unit (microcontroller) of the domestic appliance, as well as temperature sensors and the like.

Like the circuit unit 22*a* the further circuit units 22*b* to 22*n*—reference is made here to the circuit unit 22*n*—can also comprise an electrical switch 33, a mains filter 34, a bridge rectifier 35, a power pack 36, two voltage regulators 37, 38, a power divider 39, as well as a plurality of electrical consumers 40*a* to 40*f*.

Voltage supply means 41 are also directly connected to the mains connection 21. The voltage supply means 41 can comprise for example a small power pack, which can supply a supply voltage UV from the mains voltage UN. The supply voltage UV is a direct voltage. The electrical switches 25, 33 can be closed with the supply voltage UV, to switch the domestic appliance from standby mode to operating mode. An operating facility 42 of the domestic appliance, which can be an active operating facility, can also be supplied with the supply voltage UV.

A power electronics unit 43 can also be coupled to the mains connection 21, specifically by way of a further electrical switch 44. The power electronics unit 43 comprises electrical consumers—for example heating elements—which are supplied with the mains voltage UN or a rectified mains voltage obtained therefrom. The power electronics unit 43 therefore comprises electrical consumers, which are supplied with a high-amplitude electrical voltage or relatively high power. The power electronics unit 43 can also comprise a plurality of power breakers, which are designed for large currents.

The electrical switches 25, 33, 44 are preferably mechanical switches, specifically in particular relays.

The mode of operation of the circuit arrangement 20 according to FIG. 2 is described in more detail in the following:

The domestic appliance is initially in standby mode and is therefore deactivated. The electrical switches 25, 33, 44 are opened so that the main supply unit 23 as well as the power pack 36 and the power electronics unit 43 are electrically isolated from the mains connection 21. The operating voltage UB is not produced. Only the voltage supply means 41—in particular a power pack—tap the mains voltage UN in standby mode and convert it to the supply voltage UV. If the operating facility 42 is an active facility, it is now supplied with the supply voltage UV. The operator can actuate the operating facility to activate the domestic appliance or switch it to operating mode. The operator therefore actuates the operating facility 42. Based on this actuation the operating facility 42 generates an activation signal SA and emits said activation signal SA to the voltage supply means 41. Based on this activation signal SA the voltage supply means 41 close the electrical switch 25, and in some instances also the switch 33. The main supply unit 23 produces the operating voltage UB at the output 32. The main control unit of the domestic appliance (one of the consumers 29a to 29f) is now activated and supplied with the operating voltage UB. This main control unit can now close the further switches 44 and the domestic appliance is fully activated.

Provision can also be made for just the switch 25 to be closed first and for the main control unit then to close the switch 33 and optionally also further electrical switches.

When the switch 44 closes, it is also possible to take into account the profile of the mains voltage UN, as well as the temperature of an inrush current limiter coupled to the switch 44. This is based on the fact that the power electronics unit 43 generally comprises large capacitors—for example an intermediate circuit capacitor—and the inrush currents when the switch 44 closes are relatively large. If the switch 44 is closed during a zero passage of the mains voltage UN, the strength of the inrush current can be limited. Taking into account the temperature in turn ensures that the closing of the further switch 44 can be prevented, if the resistance value of the inrush current limiter (NTC) is too low.

The voltage supply means 41 can also be configured so that they can withstand a polarity reversal of the mains connection 21 (polarity reversal of the three-phase mains voltage UN). The voltage supply means 41 can then check the mains connection 21 for the polarity reversal. If a polarity reversal is identified, the electrical switches 25, 33, 44 are prevented from closing. This allows the power packs 31, 36 to have a less complex structure, as in contrast to the voltage supply means 41 they do not have to be configured to be able to withstand a polarity reversal.

Figure 3:
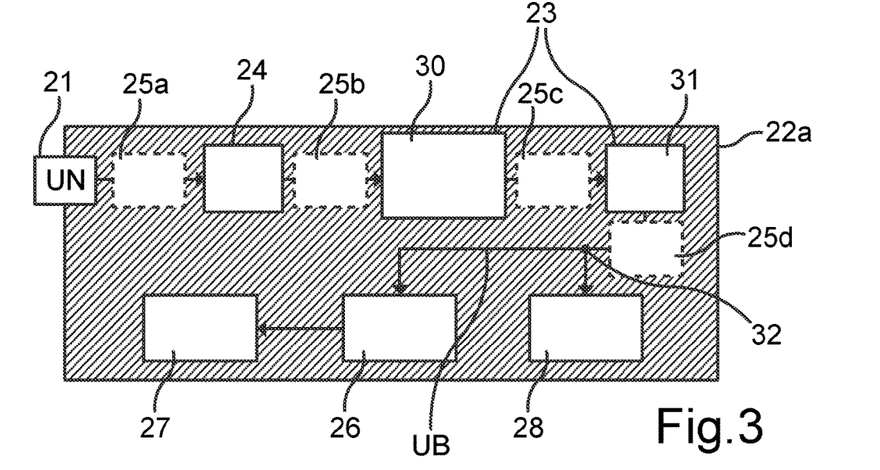
FIG. 3 shows a block circuit diagram of a circuit unit of the circuit arrangement according to FIG. 2, wherein possible arrangements of an electrical switch in relation to a main supply unit are explained in greater detail.

Use of the switch 25 means that the main supply unit 23 cannot consume electrical energy when the domestic appliance is in standby mode and losses cannot occur. It has therefore proven particularly advantageous for the electrical switch 25—as shown in FIG. 2—to be located between the mains filter 24 and the mains connection 21. The switch 25—but this also applies correspondingly to the switch 33—can however also be disposed at a different point within the circuit unit 22a. Possible arrangements of the switch 25 are shown in FIG. 3. The possible positions of the electrical switch 25 are shown here with reference characters 25a to 25d. As shown in FIG. 3, the switch 25 can be located between the mains connection 21 and the mains filter 24 or between the mains filter 24 and the bridge rectifier 30 or between the bridge rectifier 30 and the power pack 31 or at the output 32. A number of switches 25 can optionally also be used, specifically at different points 25a and/or 25b and/or 25c and/or 25d. The main task of the switch 25 is to isolate the output 32 and therefore also the voltage regulators 26, 27 and the power divider 28 from the mains connection 21, specifically when the domestic appliance is in standby mode.

Figure 4:
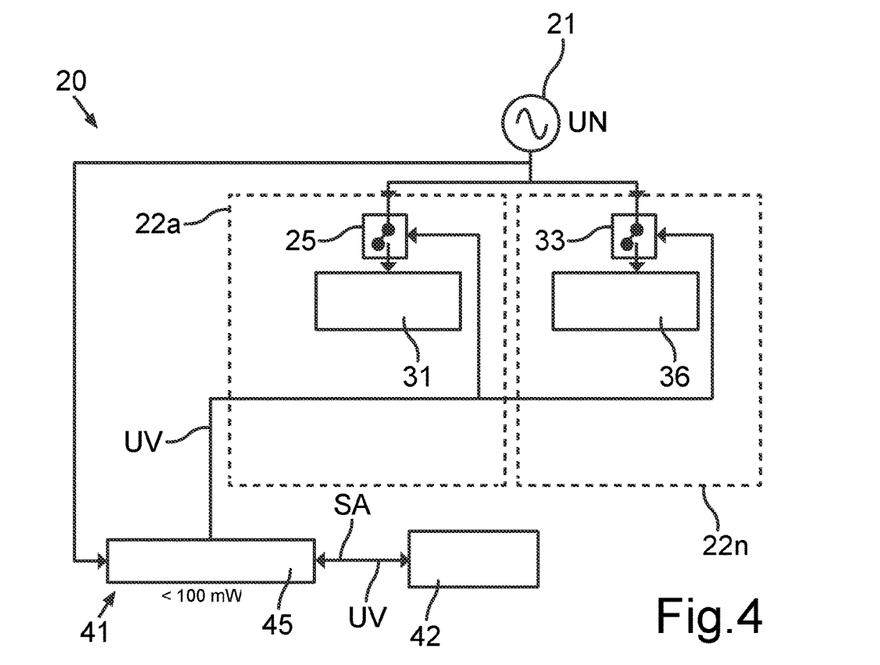
FIG. 4 shows a schematic diagram of a circuit arrangement for a domestic appliance according to one possible embodiment of the invention.
Figure 5:
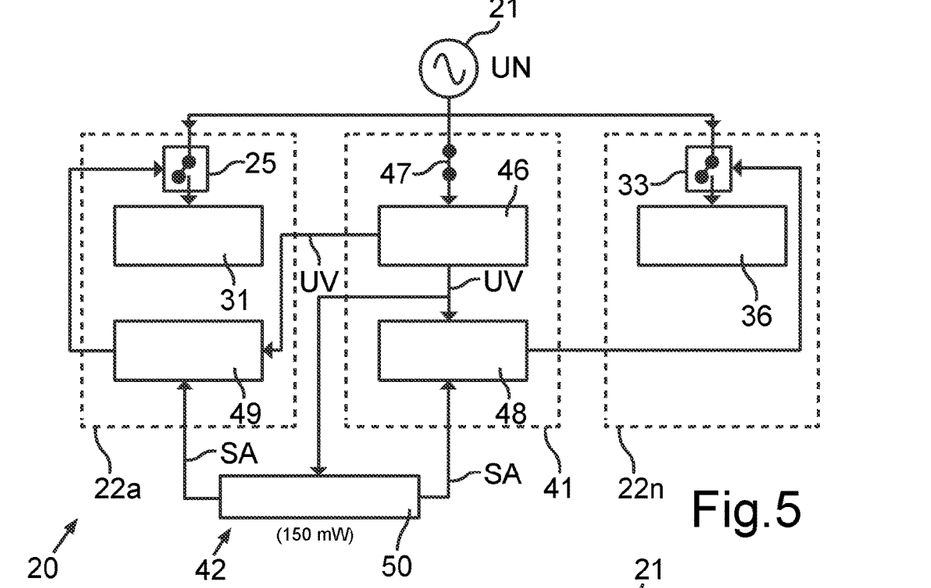
FIG. 5 shows a schematic diagram of a circuit arrangement for a domestic appliance according to a further embodiment of the invention.
Figure 6:
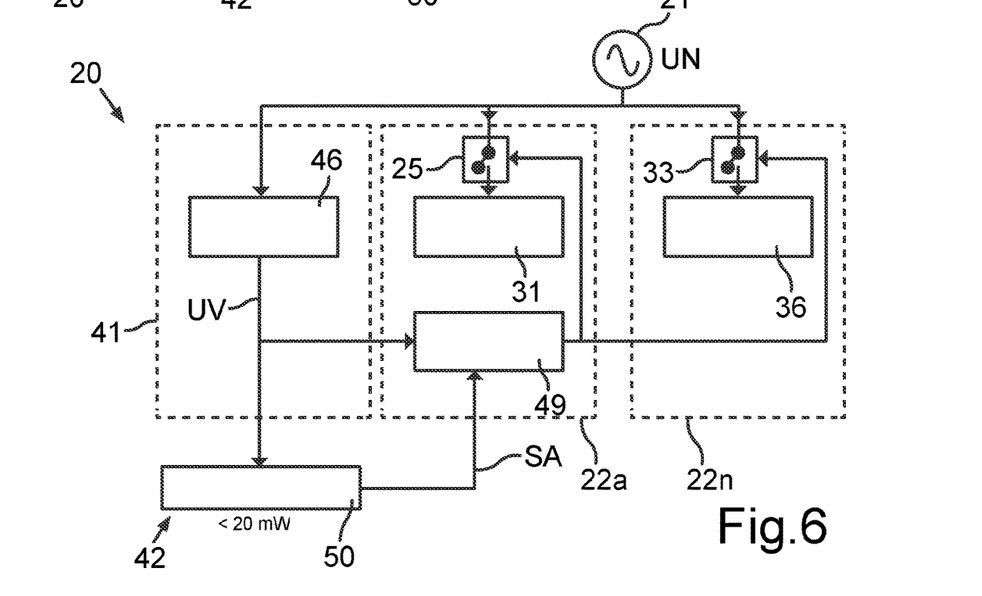
FIG. 6 shows a schematic diagram of a circuit arrangement for a domestic appliance according to yet a further embodiment of the invention.

FIGS. 4 to 6 show different embodiments of the circuit arrangement generally illustrated in FIG. 2.

The circuit arrangement 20 according to FIG. 4 comprises two circuit units 22a, 22n, which each have a power pack 31 or 36. The power packs 31, 36 can be coupled by way of respective switches 25, 33 to the mains connection 21. In standby mode the switches 25, 33 are opened and only the voltage supply means 41 tap the mains voltage UN at the mains connection 21. When bringing about the circuit arrangement 20 according to FIG. 4, a small microcontroller 45 is used as the voltage supply means 41, converting the mains voltage UN to the supply voltage UV. This microcontroller 45 can receive the activation signal SA from the operating facility 42 and close the two switches 25, 33 based on said activation signal SA, thereby switching the domestic appliance to operating mode. The microcontroller 45 only consumes an electrical power of less than 100 mW in standby mode.

The circuit arrangement 20 according to FIG. 5 also comprises two circuit units, specifically a main circuit unit 22a and a secondary or lower order circuit unit 22n. The main circuit unit 22a comprises a power pack 31, which is a main power pack of the domestic appliance. The power pack 31 can be coupled by way of the switch 25 to the mains connection 21. The secondary circuit unit 22n also comprises a power pack 36, which can be coupled by way of the switch 33 to the mains connection 21. In the exemplary embodiment according to FIG. 5 the voltage supply means 41 comprise a power pack 46, which is permanently connected by way of a bridge 47—for example a plug-in bridge—to the mains connection 21. Also associated with the voltage supply means 41 are two standby microcontrollers, specifically a first standby microcontroller 48 and a second microcontroller 49, which is part of the circuit unit 22a. In standby mode the two standby microcontrollers 48, 49 are supplied with the supply voltage UV, which is produced by the power pack 46 in standby mode. This supply voltage UV can lie in a value range from 5V to 24V. The supply voltage UV is also supplied to the operating facility 42, which in this instance comprises a microcontroller 50. When the operating facility 42 is actuated by the operator, the microcontroller 50 generates activation signals SA to the standby microcontrollers 48, 49 and the standby microcontrollers 48, 49 close the respective switches 25 or 33 based on said activation signals SA. The microcontroller 50 can be connected to the standby microcontrollers 48, 49 for example by way of a communication bus, specifically for example by way of the LIN bus. The activation signals SA can therefore be messages, which are transmitted by way of the communication bus to the standby microcontrollers 48, 49. In standby mode the microcontroller 50 only consumes 150 mW. The standby microcontrollers 48, 49 here can also be switched to an internal standby and only be activated with the activation signals SA.

The circuit arrangement 20 according to FIG. 6 corresponds essentially to the circuit arrangement 20 according to FIG. 5 except that there is no standby microcontroller 48. Instead the switch 33 is also closed by means of the standby microcontroller 49. The microcontroller 50 of the operating facility 42 here can be embodied smaller, because it only has to emit the activation signal SA to a single standby microcontroller 49. The microcontroller 50 here consumes a power of less than 20 mW in standby mode.

The invention claimed is:

1. A domestic appliance, comprising:
a mains connection at which an electrical mains voltage can be applied relative to a reference potential;
a main supply unit configured to supply an electrical operating voltage from the mains voltage at its output;
at least one electrical consumer configured for receiving the operating voltage;
an electrical switch electrically isolating at least the output of the main supply unit from the mains connection, when the domestic appliance is in a standby mode;
a voltage supply separate from the main supply unit and coupled to the mains connection; and
an operating facility,
said voltage supply tapping the mains voltage at the mains connection in the standby mode and supplying a supply voltage from the mains voltage only sufficient for operating the operating facility and switching the electrical switch to an electrically conducting switching state to thereby switch the domestic appliance from the standby mode to an operating mode, and
the operating facility configured to generate an activation signal, when an operator actuates the operating facility, to thereby switch the electrical switch to the electrically conducting switching state,
wherein the electrical switch electrically isolates the output of the main supply unit from the mains connection until such time as the operating facility is actuated by the operator and generates the activation signal to the electrical switch to switch the domestic appliance from the standby mode to the operating mode, and
wherein the domestic appliance is one of a domestic cooking appliance and a domestic laundry care appliance.

2. The domestic appliance of claim 1, wherein only the voltage supply is connected to the mains connection in the standby mode.

3. The domestic appliance of claim 1, wherein the electrical switch is a mechanical switch.

4. The domestic appliance of claim 1, wherein the electrical switch is a relay.

5. The domestic appliance of claim 1, wherein the electrical switch is disposed electrically between the mains connection and the main supply unit.

6. The domestic appliance of claim 1, further comprising a mains filter coupled to the main supply unit, said electrical switch being disposed electrically between the mains connection and the mains filter.

7. The domestic appliance of claim 1, further comprising a power electronics unit, and a further switch to couple the power electronics unit to the mains connection, wherein the electrical switch is switchable to the electrically conducting switching state before the further switch is switched to an electrically conducting switching state, when the domestic appliance is switched from the standby mode to the operating mode.

8. The domestic appliance of claim 7, wherein the further switch is a mechanical switch.

9. The domestic appliance of claim 7, wherein the further switch is switched to the conducting switching state as a function of a profile of the mains voltage.

10. The domestic appliance of claim 7, further comprising an inrush current limiter connected in series to the further switch to protect the further switch from an inrush current, said further switch being switchable as a function of a detected temperature of the inrush current limiter.

11. The domestic appliance of claim 1, wherein the voltage supply is configured to check the mains connection for any polarity reversal based on a tapped mains voltage in the standby mode.

12. The domestic appliance of claim 7, wherein the power electronics unit comprises a heating element of the domestic appliance.

13. The domestic appliance of claim 1, wherein an input of the voltage supply is connected directly to the mains connection and the output of the voltage supply is connected directly to the electrical switch.

14. The domestic appliance of claim 1, wherein the operating facility is a capacitive switch, and
wherein the voltage supply supplies the supply voltage from the mains voltage only sufficient for operating the capacitive switch and switching the electrical switch to the electrically conducting switching state.

15. The domestic appliance of claim 1, wherein the operating facility generates and emits only the activation signal to switch the electrical switch to the electrically conducting switching state.

16. A method for operating a domestic appliance, comprising:
applying an electrical mains voltage relative to a reference potential at a mains connection;
supplying an electrical operating voltage at an output of a main supply unit from the mains voltage;
supplying at least one electrical consumer with the operating voltage;
electrically isolating the main supply unit from the mains connection by an electrical switch, when the domestic appliance is in a standby mode;
coupling a voltage supply to the mains connection;
tapping the mains voltage at the mains connection in the standby mode;
supplying a supply voltage from the mains voltage only sufficient to operate an operating facility and to switch the electrical switch to an electrically conducting switching state for switching the domestic appliance from the standby mode to an operating mode; and coupling the operating facility to the supply voltage, the operating facility configured to generate an activation signal when an operator actuates the operating facility to thereby switch the electrical switch to the conducting switching state, wherein the electrical switch electrically isolates the output of the main supply unit from the mains connection until such time as the operating facility is actuated by the operator and generates the activation signal to the electrical switch to switch the domestic appliance from the standby mode to the operating mode, and wherein the domestic appliance is one of a domestic cooking appliance and a domestic laundry care appliance.

17. The method of claim 16, wherein the operating facility is a capacitive switch.

18. The method of claim 16, further comprising:
electrically isolating a power electronics unit from the mains connection by a further switch; and
coupling the power electronics unit to the mains connection by switching the further electrical switch to a conducting switching state after the electrical switch is switched to the conducting switching state when the domestic appliance is switched from the standby mode to the operating mode.

19. The method of claim 18, wherein the power electronics unit comprises a heating element of the domestic appliance.

20. A domestic appliance, comprising:
a mains connection at which an electrical mains voltage can be applied relative to a reference potential;
a main supply unit configured to supply an electrical operating voltage from the mains voltage;
at least one electrical consumer coupled to an output of the main supply unit and configured for receiving the operating voltage from the output of the main supply unit;
an electrical switch coupled between the mains connection and the main supply unit, the electrical switch electrically isolating at least the output of the main supply unit from the mains connection, when the domestic appliance is in a standby mode;
a voltage supply separate from the main supply unit and coupled between the mains connection and the electrical switch; and
an operating facility coupled to the voltage supply, the operating facility configured to generate an activation signal when an operator actuates the operating facility to thereby switch the electrical switch to the conducting switching state,
wherein the voltage supply taps the mains voltage at the mains connection in the standby mode and supplies a supply voltage from the mains voltage only sufficient for operating the operating facility and switching the electrical switch between a non-electrically conducting switching state and an electrically conducting switching state to thereby switch the domestic appliance from the standby mode to an operating mode, and
wherein the domestic appliance is one of a domestic cooking appliance and a domestic laundry care appliance.

21. The domestic appliance of claim 20, wherein an input of the voltage supply is connected directly to the mains connection and the output of the voltage supply is connected directly to the electrical switch.

22. The domestic appliance of claim 20, wherein the operating facility is a capacitive switch, and
wherein the voltage supply supplies the supply voltage from the mains voltage only sufficient for operating the capacitive switch and switching the electrical switch to the electrically conducting switching state.

23. The domestic appliance of claim 20, further comprising a power electronics unit, and a further switch to couple the power electronics unit to the mains connection, wherein the electrical switch is switchable to the electrically conducting switching state before the further switch is switched to an electrically conducting switching state, when the domestic appliance is switched from the standby mode to the operating mode.

24. The domestic appliance of claim 23, wherein the power electronics unit comprises a heating element of the domestic appliance.

25. A domestic appliance, comprising:
a mains connection at which an electrical mains voltage can be applied relative to a reference potential;
a main supply unit configured to supply an electrical operating voltage from the mains voltage at its output;
at least one electrical consumer configured for receiving the operating voltage;
an electrical switch electrically isolating at least the output of the main supply unit from the mains connection, when the domestic appliance is in a standby mode;
a voltage supply separate from the main supply unit and coupled to the mains connection, said voltage supply tapping the mains voltage at the mains connection in the standby mode; and
a capacitive switch configured to generate an activation signal, when an operator actuates the capacitive switch, to thereby switch the electrical switch to an electrically conducting switching state to thereby switch the domestic appliance from the standby mode to an operating mode,
wherein the electrical switch electrically isolates the output of the main supply unit from the mains connection until such time as the capacitive switch is actuated by the operator and generates the activation signal to the electrical switch to switch the domestic appliance from the standby mode to the operating mode, and
wherein the voltage supply supplies the supply voltage from the mains voltage only sufficient for operating the capacitive switch and switching the electrical switch to the electrically conducting switching state.

* * * * *